July 5, 1949.  G. H. BROWN  2,475,560
ELECTRIC MOTOR
Filed May 12, 1945  5 Sheets-Sheet 1
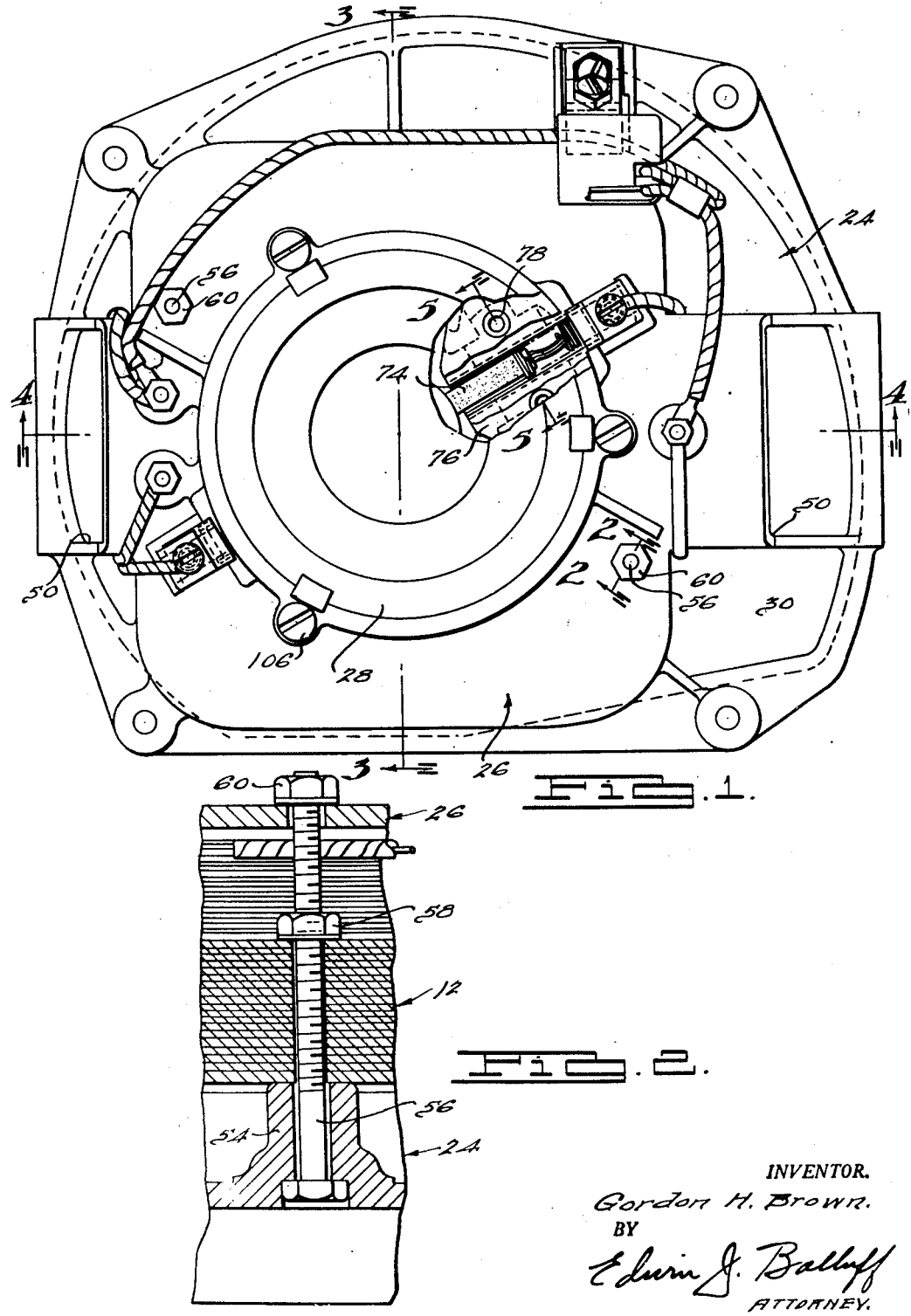
INVENTOR.
Gordon H. Brown.
BY
Edwin J. Balluff
ATTORNEY.

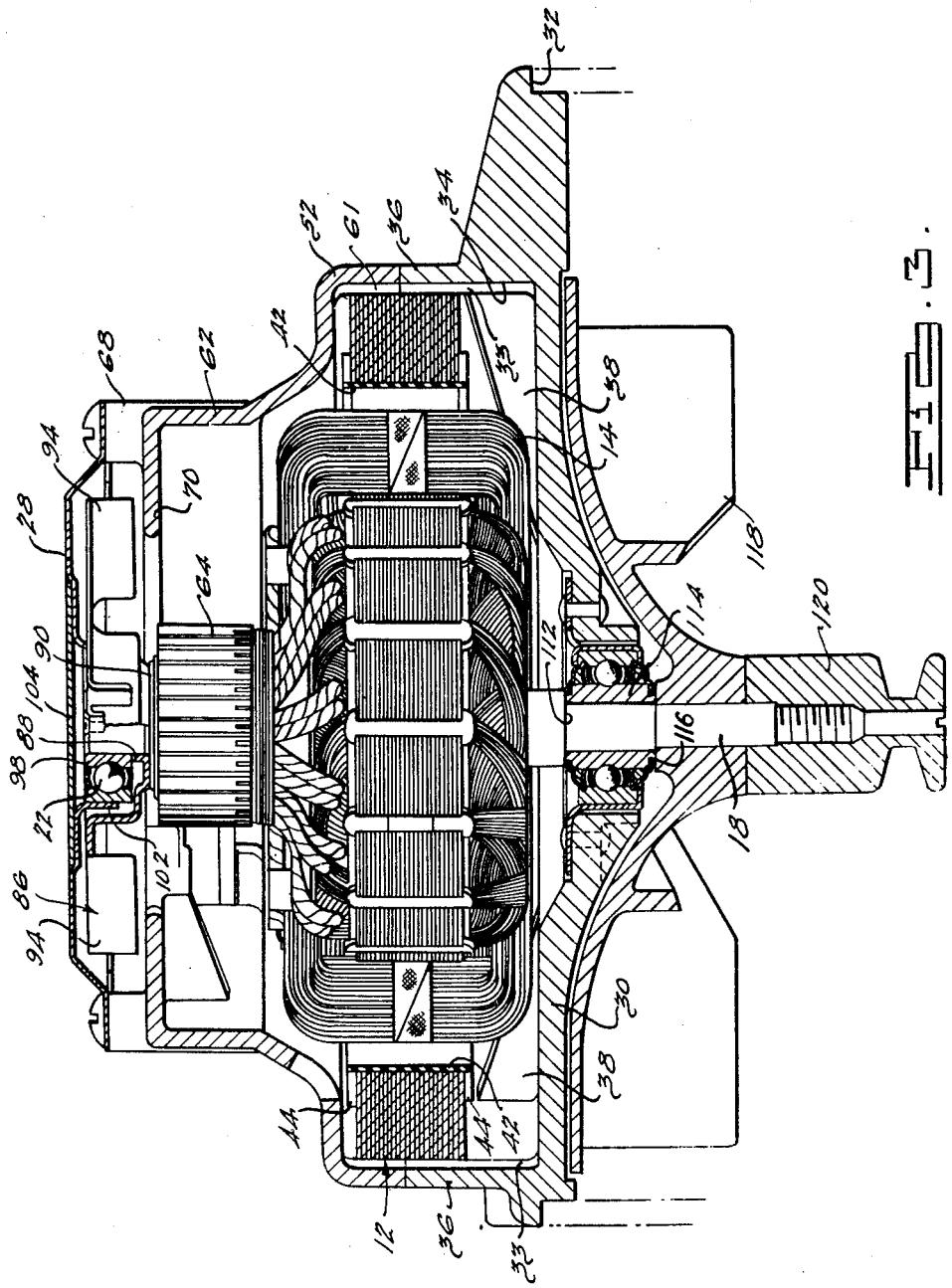

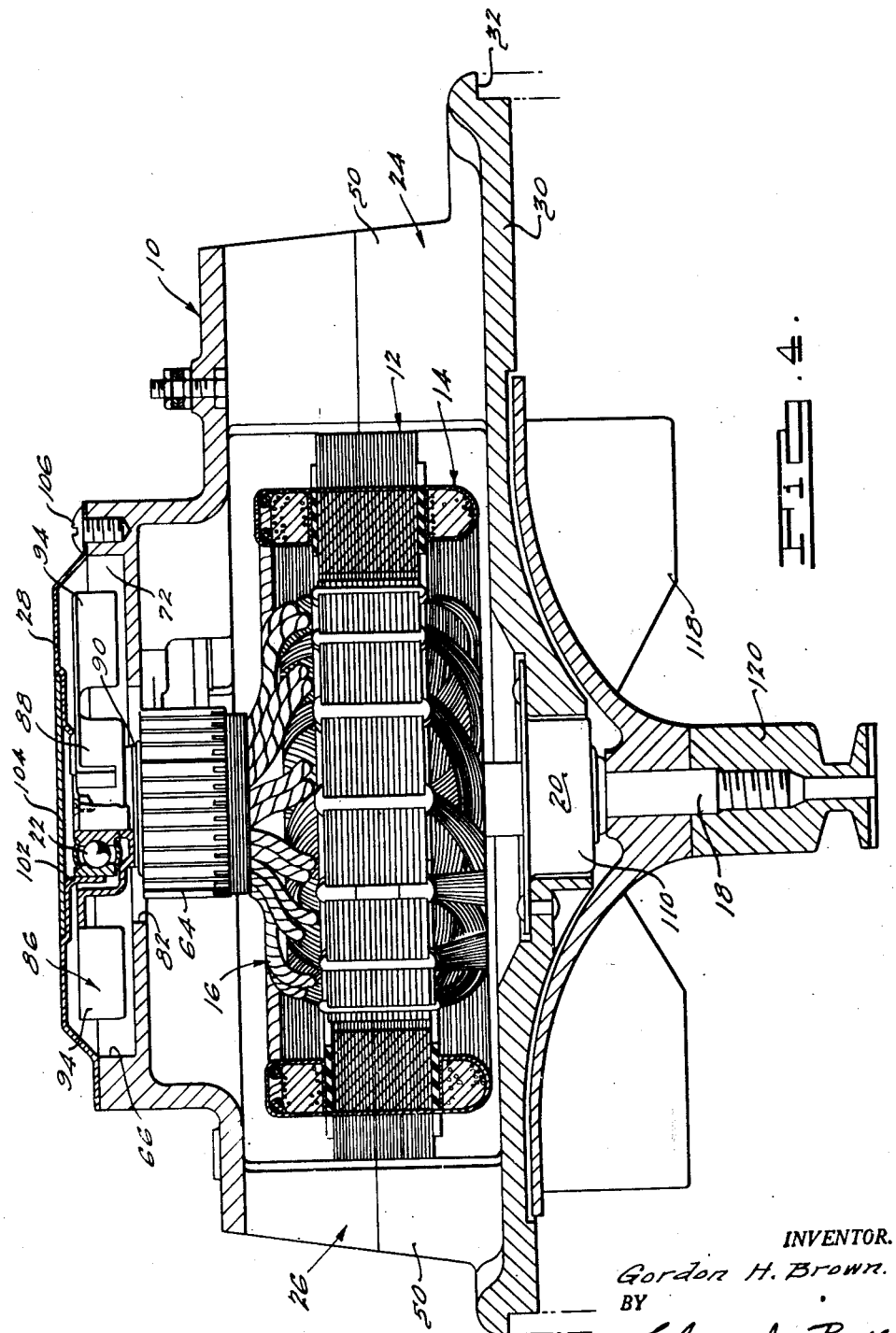

July 5, 1949.  G. H. BROWN  2,475,560
ELECTRIC MOTOR
Filed May 12, 1945　　5 Sheets-Sheet 4
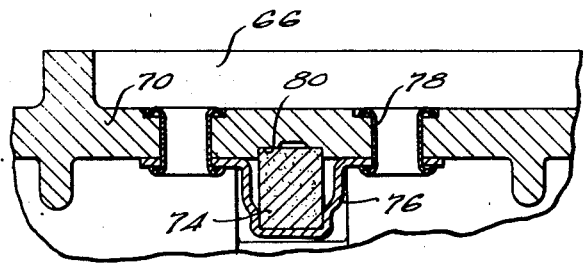
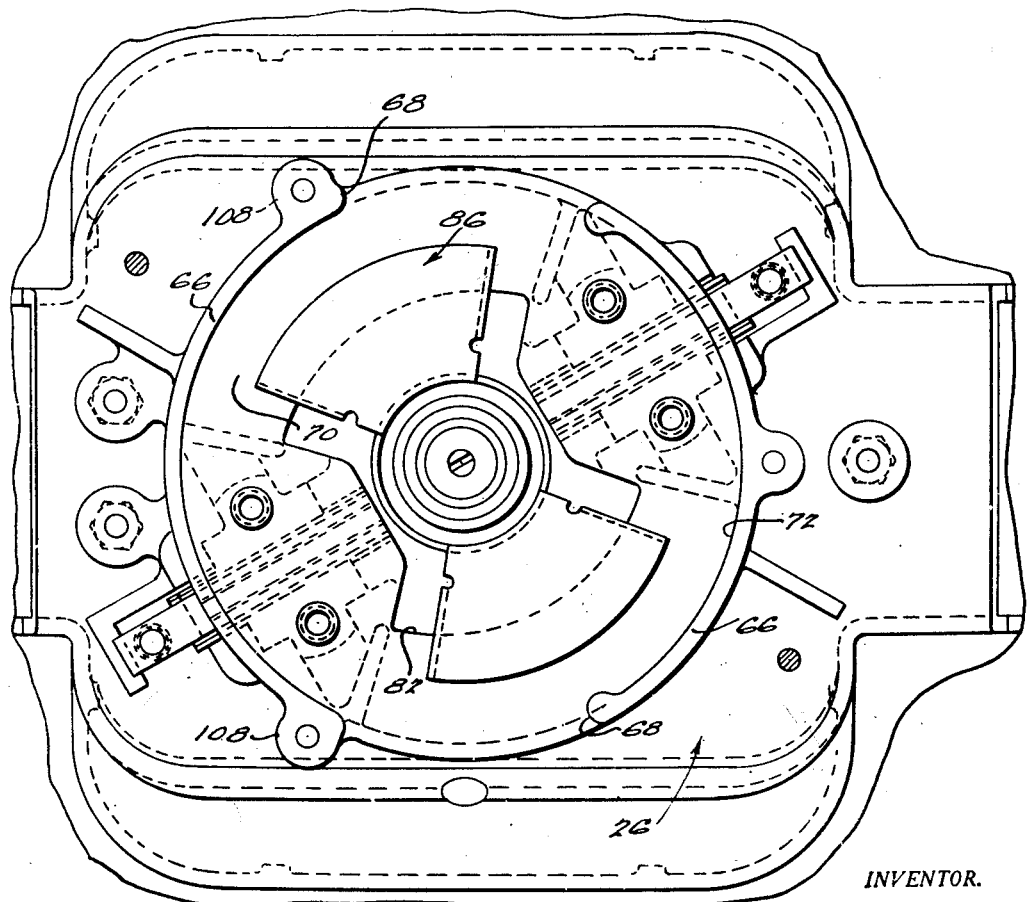
INVENTOR.
Gordon H. Brown.
BY
Edwin J Belhoff
ATTORNEY.

July 5, 1949.  G. H. BROWN  2,475,560
ELECTRIC MOTOR

Filed May 12, 1945  5 Sheets-Sheet 5

INVENTOR.
Gordon H. Brown.
BY
Edwin J. Balluff
ATTORNEY.

Patented July 5, 1949

2,475,560

UNITED STATES PATENT OFFICE 2,475,560

ELECTRIC MOTOR

Gordon H. Brown, Detroit, Mich., assignor to Eureka Williams Corporation, a corporation of Michigan Application May 12, 1945, Serial No. 593,361

18 Claims. (Cl. 172—36)

This invention relates to motors and has particular reference to one for use in suction cleaners.

A principal object of the invention is to provide a new and improved electric motor.

Another object is to provide an electric motor which is particularly adapted for use in a suction cleaner and is characterized by relatively low height and provisions which enable the armature and its shaft to be readily removed.

Another object of the invention is to provide a novel and efficient bearing and ventilating fan arrangement for an electric motor.

Other and further objects of the invention will be apparent from the following description and claims and will be understood by reference to the accompanying drawings, of which there are five sheets, which, by way of illustration, show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims. I also contemplate that of the several different features of my invention, certain ones thereof may be advantageously employed in some applications separate and apart from the remainder of the features.

In the drawings:

Fig. 1 is a plan view of an electric motor embodying the invention;

Fig. 2 is a fragmentary sectional view taken in a plane along the line 2—2 of Fig. 1;

Fig. 3 is a vertical sectional view taken generally along the line 3—3 of Fig. 1;

Fig. 4 is a vertical sectional view taken at right angles to Fig. 3 and generally along the line 4—4 of Fig. 1;

Fig. 5 is a cross sectional view of the brush holder taken along the line 5—5 of Fig. 1;

Fig. 6 is a plan view of the motor with the upper bearing retainer plate removed;

Figure 8:
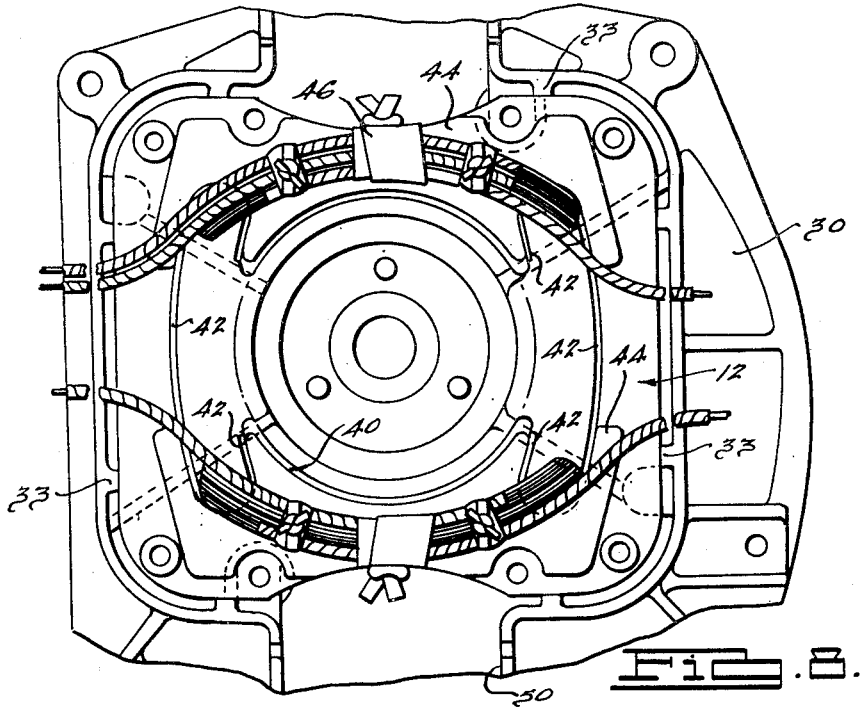
Fig. 8 is a plan view of the lower half of the motor case with the field and its windings assembled thereto.

An electric motor embodying the invention as illustrated in the drawings in a form suitable for use in a suction cleaner comprises a motor case 10, a field 12 including windings 14, an armature 16 mounted upon a vertical shaft 18 which is journaled for rotation in lower bearing 20 and upper bearing 22. The motor case 10 is formed in three parts: namely, a lower case or base 24, a cover 26, and an upper bearing retainer plate 28.

The lower case member 24 includes a generally flat, plate-like portion 30 having a marginal seat 32 which is adapted to be supported upon the upper rim of the suction chamber of the cleaner and includes upstanding walls defining a cavity 34 for accommodating and seating the field 12. Ribs 33 formed on the upstanding walls 36 of the lower motor case member 24 cooperate with the outer periphery of the field 12 to locate and center the same. The bottom of the cavity 34 may be provided with a plurality of ribs, such as 38, which serve to reinforce the side walls 36.

The field 12 is formed of a stack of laminations and includes opposed pole faces 40 between which the armature 16 is rotatably mounted. Particular attention is directed to the fact that the slots in the field between the pole faces 40 are lined with strips 42 of insulating material, and that the upper and lower faces of the field are partially covered by strips 44 of insulating material.

The field windings 14 are untaped and are insulated from the laminae of the field 12 by the insulating strips 42 and 44. The arrangement of the slots between the poles 40 expedites the mounting of the windings 14 on the field 12, the windings 14 each being taped as indicated at 46 to the field for securing the same in position.

The upstanding walls of the lower motor case member 24 also form part of air inlet ports 50 at opposite sides of the motor for admitting air to the interior of the motor and around the windings 14 for dissipating the heat thereof.

The upper motor case member or cover 26 is formed to define a cavity for receiving and housing when assembled on the lower case member 24, the upper portions of the field 12, armature, etc., and to this end the side walls 52 are formed to telescope the outer periphery of the field 12 and seat on the upper edge of the upstanding walls 36 of the lower case member 24. The cover 26 is also formed to define the upper parts of the air inlet ports 50, as clearly illustrated in Figs. 1 and 4.

The cavity formed in the lower motor case member 24 is provided with four circumferentially spaced bosses 54 (one of which is shown in Fig. 2), the upper faces of which bosses all lie in the same plane and define seats for supporting the field 12. At least some of the bosses 54 are hollow so as to accommodate the shank of a bolt 56, the head of which is countersunk in a socket in the under face of the case member 24. The field 12 is provided with a hole through which the shank of the bolt 56 extends, and a nut 58 is threadedly secured on the shank of the bolt 56 for clamping the field 12 on its seat. The shank of the bolt 56 projects upwardly through an opening in the top of the upper motor case member or cover 26 and is provided with a second nut 60 which functions to clamp the cover 26 on the base or lower motor case member 24. In the present instance I have employed two bolts 56, each with the spaced nuts 58 and 60 thereon for clamping the field and the cover to the base 24, as illustrated in Fig. 2.

The cavity in the cover 26 is located with reference to the outer periphery of the field 12 by means of ribs 61. The side walls 62 of the cover project upwardly beyond the commutator 64 to define the side walls 66 of a fan chamber together with outlets 68 therefrom and a horizontal wall 70 forming the bottom wall of the motor cooling fan chamber 72. The wall 70 forms a support for the commutator brushes 74 and their holders 76. The holders 76 may comprise stamped guides formed to accommodate the brushes 74 and support the same for sliding movement, and are secured by rivets 78 to the under side of the wall 70. The wall 70 may be grooved as indicated at 80 so as to form part of the guide for the brush 74. It will be understood that the brushes are backed up by springs for urging the same into operative engagement with the bars of the commutator 64.

The upper and lower motor case members 24 and 26 are formed of a molded insulating material of the type commonly designated as a plastic, such as Bakelite. The wall 70 is provided with a central opening 82 through which the upper end of the armature shaft 18 extends. A fan 86 is arranged in the fan chamber 72 and the fan hub 88 is pressed on the upper end of the armature shaft 18 against a spacer 90 which seats against the upper face of the commutator 64. The fan 86 as illustrated is formed from a stamping and includes, in addition to the hub 88, two oppositely arranged flat segments 92 having vertically extending portions 94 forming fan blades so that during operation of the motor the fan 86 will function to discharge air radially through the outlet ports 68 provided between the upstanding walls 66. Opening 82 provides an air inlet to the fan 86.

The inner race 98 of the upper ball bearing 22 is pressed on the upper end of the armature shaft 18 above the hub 88 of the fan and functions to hold the fan 86 in position. Particular attention is directed to the fact that the bearing 22 is arranged in the hub of the fan 86 so that the fan 86 and the bearing 22 both lie in the same plane. In other words, outside of the relatively small distance between the bearing 22 and the washer 90, the fan 86 does not occupy any space along the axis of the armature shaft 18 except outwardly of the bearing 22.

The outer race of the bearing 22 is readily removably positioned in a socket formed by a boss 102 formed centrally in the bearing retainer plate 28, and a plate 104 may be welded or otherwise secured to the retainer plate 28 so as to close the opening above the bearing in order to help keep dirt out of the bearing. Thus, the boss 102 centers the bearing 22 and the upper end of the shaft 18. The upper bearing retainer plate 28 seats on the upper rim of the walls 66 and is secured by screws 106 to threaded posts 108 formed integrally with the upper motor case member 26. The lower bearing 20 for the armature shaft is enclosed in a cup 110 which is seated in a bearing recess formed in the bottom wall of the cavity 34 in the lower motor case member 24. The shaft 18 is provided with a shoulder 112 which seats on the upper end of the inner race 114 of the bearing 20 but the shaft 18 is not pressed therein.

Figure 7:
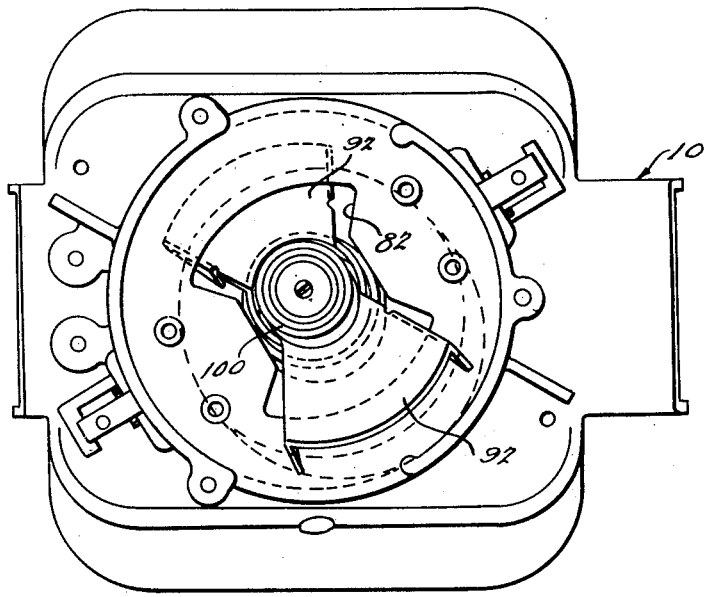
Fig. 7 is a view similar to Fig. 6 and illustrating the manner in which the armature shaft, the upper motor bearing and fan may be removed as a unit from the motor case.

A shoulder 116 on the hub of the fan 118 of the suction cleaner is seated against the lower end of the inner bearing race 114 and secured thereagainst by a nut 120 which cooperates with the threaded lower end of the shaft 18 for holding the fan 118 on the shaft 18. The nut 120 is in the form of a pulley for driving engagement with a belt for driving the agitator of the cleaner. The cleaner is made so that pulley 120 is accessible through the air intake opening to the fan chamber. Thus, by removing the nut 120 and the two nuts 60, the upper motor case member 26 and the armature, together with its shaft 18, commutator 64, upper bearing 22, and fan 86, may be lifted off the base 24. Then, by removing screws 106 the upper bearing retainer plate 28 may be removed, after which the armature and shaft 18 (with the upper bearing and fan thereon) may be tilted and displaced sideways relative to the case member 26 in the manner illustrated in Fig. 7 so as to slide the segments 92 of the fan 86 through the opening 82. In this way the armature shaft, fan and upper bearing 22 may be readily removed as a unit from the motor case 10.

While I have illustrated and described a preferred embodiment of my invention, it is understood that this is capable of modification and I therefore do not wish to be limited to the precise details set forth but desire to avail myself of such changes and alterations which fall within the purview of the following claims.

I claim:

1. In an electric motor a casing, bearings carried thereby, an armature shaft journaled in said bearings, an armature and commutator carried by said shaft and a motor cooling fan carried by said shaft adjacent said commutator and having axially extending fan blades positioned radially outwardly of one of said bearings, the axial extent of said one of said bearings and said fan being substantially coextensive, said casing being provided with openings defining a path for the circulation of air by said fan through said casing and over the heat generating parts of the motor.

2. In an electric motor a casing, an armature shaft, bearings for said shaft including one carried thereby, said casing having provisions for positioning said bearings, said shaft having a commutator adjacent said one bearing carried by said shaft, and a motor cooling fan secured on said shaft and clamped between and by said one bearing and said commutator, the axial extent of said fan and said one bearing being substantially coextensive said casing being provided with openings defining a path for the circulation of air by said fan through said casing and over the parts of the motor, said casing comprising separable members constructed and arranged to be disassembled to permit the separation therefrom of said armature shaft, fan and said one bearing as a unit.

3. In an electric motor a casing comprising upper and lower members detachably secured together to define a housing for the motor, said lower casing member being formed to provide a bearing seat for a lower bearing, a bearing fixed in said bearing seat, a bearing plate detachably secured to said upper casing member and having a bearing seat, an armature shaft removably arranged in said bearing and having a bearing pressed on the upper end of said shaft, and thereby positioned in said last mentioned bearing seat, a fan on said shaft at the upper end thereof, said casing being provided with openings defining a path for the circulation of air by said fan through said casing and over the parts of said motor, said shaft projecting below said lower bearing and having removable thrust means on the shaft below said bearing and means on said shaft above said bearing for securing said shaft against axial displacement relative to said bearing, said upper casing member being provided with an apertured partition below said upper bearing which cooperates with said bearing plate to define a motor cooling fan chamber, the aperture in said partition being smaller than said fan which is arranged in said chamber but of a size to permit said fan when tilted relative to said partition to pass through said aperture, said upper casing member and armature shaft being separable from the lower casing member and bearing carried thereby as a unit upon removal of said removable thrust means from the lower end of said shaft, said armature shaft with said fan and upper bearing thereon being separable as a unit from said upper casing member after separation thereof from said lower casing member and after separation of said bearing plate from said upper casing member by displacing said shaft toward one side of said aperture in said partition and then tilting said shaft relative to said casing so as to permit the translation of said fan and bearing through said aperture thereby to complete the removal of said armature shaft from said upper and lower casing members.

4. In an electric motor a casing comprising a plurality of members detachably secured together to define a housing for the motor, one of said casing members being formed to provide a bearing seat for a bearing, a bearing positioned in said bearing seat, a bearing plate detachably secured to the other of said casing members and having a bearing seat, an armature shaft supported at one end by said bearing and having a bearing pressed on the other end of said shaft which is thereby positioned in said last mentioned bearing seat, a fan on said shaft at said other end thereof, said casing being provided with openings defining a path for the circulation of air by said fan through said casing and over the parts of said motor, said shaft projecting beyond said first-mentioned bearing and having removable thrust means on the shaft beyond said bearing and means on said shaft on the other side of said bearing for securing said shaft against axial displacement relative to said bearing, said other casing member being provided with an apertured partition inwardly of said second-mentioned bearing which cooperates with said bearing plate to define a motor cooling fan chamber, said fan being arranged in said chamber, said other casing member and armature shaft being separable from the first-mentioned casing member and bearing carried thereby as a unit upon removal of said removable thrust means from the end of said shaft, said armature shaft with said fan and second-mentioned bearing thereon being separable as a unit from said other casing member after separation of said bearing plate from said other casing member by displacing said shaft toward one side of said aperture in said partition and then tilting said shaft relative to said casing so as to permit the translation of said fan and bearing through said aperture thereby to complete the removal of said armature shaft from said upper and lower casing members.

5. A motor construction according to claim 4 in which said fan includes blades positioned radially outwardly of said second mentioned bearing.

6. In an electric motor a casing comprising upper and lower members detachably secured together to define a housing for the motor, said lower casing member being formed to provide a bearing seat for a bearing, a bearing positioned in said bearing seat, a bearing plate detachably secured to said upper casing member and having a bearing seat, an armature shaft removably supported at one end by said bearing and having a bearing pressed on the upper end of said shaft which is thereby positioned in said last-mentioned bearing seat, a fan and commutator on said shaft at the upper end thereof with the hub of said fan secured by and between said upper bearing and commutator, said casing being provided with openings defining a path for the circulation of air by said fan through said casing and over the heat generating parts of said motor, said upper case member being provided with an apertured partition below said upper bearing which cooperates with said bearing plate to define a motor cooling fan chamber, the aperture in said partition being smaller than said fan which is arranged in said chamber but of a size to permit said fan when tilted relative to said partition to pass through said aperture, said upper casing member and armature shaft being separable from the lower casing member, said armature shaft with said fan and upper bearing thereon being separable as a unit from said upper casing member after separation thereof from said lower casing member and after separation of said bearing plate from said upper casing member by displacing said shaft toward one side of said aperture in said partition and then tilting said shaft relative to said casing so as to permit the translation of said fan and bearing through said aperture thereby to complete the removal of said armature shaft from said upper and lower casing members.

7. A motor as defined in claim 6 in which said fan is provided with blades positioned radially outwardly of said upper bearing.

8. In an electric motor a casing therefor, vertically spaced bearings carried by said casing, a vertical armature shaft rotatably supported by said bearings, and a motor cooling fan carried by said shaft and having fan blades positioned radially outwardly of one of said bearings, the axial extent of said one of said bearings and said fan being substantially coextensive, said one of said bearings being pressed on said shaft with a portion of the center of said fan clamped between said bearing and a shoulder on said shaft so that said bearing holds said fan in position, said casing being provided with openings defining a path for the circulation of air by said fan through said casing and over the heat generating parts of the motor, and removable means for supporting said one of said bearings including a socket arranged in nested relation with respect to and between said one of said bearings and the hub of said fan.

9. In an electric motor a casing, a vertical armature shaft having a commutator adjacent one end thereof, vertically spaced bearings for said shaft, the upper one of said bearings being pressed on said shaft, a bearing plate secured to the upper end of said casing and having a socket removably accommodating the upper one of said bearings thereby to center said bearing and the upper end of said shaft, and a motor cooling fan clamped on said shaft by and between said upper bearing and said commutator and having fan blades positioned radially outwardly of said upper one of said bearings, the axial extent of said fan and upper bearing being substantially coextensive, said casing having an end wall adjacent said commutator with a central opening through which said shaft extends, said end wall and said bearing plate being arranged to define a fan chamber in which said fan is arranged, said opening in said end wall being of such size and shape that said fan and upper bearing may be moved therethrough while assembled to said shaft so as to permit disassembly of said motor, said casing and fan chamber being provided with openings defining a path for the circulation of air by said fan through said casing and over the heat generating parts of the motor, said end wall forming supporting means for brushes for said commutator.

10. In an electric motor a casing, bearings carried thereby, an armature shaft journaled in said bearings and having a commutator adjacent one end thereof, one of said bearings being pressed on said shaft, a bearing plate detachably secured to one end of said casing and provided with means removably embracing said one of said bearings thereby to locate and center said bearing and one end of said shaft and so that said plate is removable independently of said bearing, and a motor cooling fan clamped on said shaft by and between said commutator and said one bearing and having fan blades positioned radially outwardly of said one of said bearings, the axial extent of said one bearing and said fan being substantially coextensive, said casing being provided with openings defining a path for the circulation of air by said fan through said casing and over the heat generating parts of the motor.

11. In an electric motor a casing including an apertured end wall, an armature shaft extending through the aperture in said end wall, spaced bearings for said shaft, a bearing plate detachably secured to said casing and cooperating with said end wall to define at least part of a motor cooling fan chamber, said plate being provided with means removably embracing one of said bearings thereby to locate and center said bearing, and a motor cooling fan carried by and secured to said shaft and positioned in said fan chamber and having fan blades positioned radially outwardly of said one of said bearings, a commutator carried by said shaft adjacent said fan and cooperating with said one of said bearings to secure said fan to said shaft, said casing and fan chamber being provided with openings defining a path for the circulation of air by said fan through said casing and over the heat generating parts of the motor, said aperture in said end wall being of such size that said fan may be moved therethrough while assembled to said shaft so as to permit disassembly of said motor, said end wall forming a supporting means for brushes for said commutator.

12. In an electric motor a casing comprising upper and lower members detachably secured together to define a housing for the motor, said lower member being formed to provide a bearing seat for a lower bearing, a bearing fixed in said bearing seat, a bearing plate detachably secured to said upper member and having a bearing seat, an armature shaft removably arranged in said bearing and having a bearing pressed on the upper end of said shaft and positioned in said last-mentioned bearing seat and a commutator adjacent said upper bearing, a fan on said shaft at the upper end thereof, said casing being provided with openings defining a path for the circulation of air by said fan through said casing and over parts of said motor, said shaft projecting below said lower bearing and having removable thrust means on the shaft below said bearing and means on said shaft above said bearing for securing said shaft against axial displacement relative to said bearing, said upper casing member being provided with an apertured partition below said upper bearing which cooperates with said bearing plate to define a motor cooling fan chamber, commutator brushes carried by said partition, the aperture in said partition being of such size and shape as to permit said fan and upper bearing to be passed therethrough while assembled on said shaft, said upper casing member and armature shaft being separable from the lower casing member and bearing carried thereby as a unit upon removal of said removable thrust means from the lower end of said shaft, said armature shaft with said fan and upper bearing thereon being separable as a unit from said upper casing member after separation thereof from said lower casing member and after separation of said bearing plate from said upper casing member by translating said fan and bearing through said aperture thereby to complete the removal of the armature shaft from said upper and lower casing members.

13. In an electric motor a casing comprising upper and lower members detachably secured together to define a housing for the motor, said lower casing member being provided with a bearing, a bearing plate detachably secured to said upper casing member and having a bearing seat, an armature shaft arranged in said bearing and having a bearing pressed on the upper end of said shaft which is positioned in said last-mentioned bearing seat, a commutator on said shaft adjacent said upper bearing, a fan on said shaft at the upper end thereof, said casing being provided with openings defining a path for the circulation of air by said fan through said casing and over parts of said motor, said upper casing member being provided with an apertured partition below said upper bearing which cooperates with said bearing plate to define a motor cooling fan chamber, commutator brushes carried by said partition, the aperture in said partition being of such size and shape as to permit said shaft with said fan and bearing assembled thereto to be disassembled as a unit from said upper casing member, said upper casing member and armature shaft being separable from the lower casing member as a unit, said armature shaft with said fan and upper bearing thereon being separable as a unit from said upper casing member after separation thereof from said lower casing member and after separation of said bearing plate from said upper casing member by translating a part of said unit through said aperture thereby to complete the removal of the armature shaft from said upper and lower casing members.

14. A motor as defined in claim 13 wherein the axial extent of said fan and said bearing which is pressed on the shaft are substantially coextensive.

15. In an electric motor a casing comprising upper and lower members detachably secured together to define a housing for the motor, said lower casing member being provided with a bearing, a bearing detachably secured to said upper casing member, an armature shaft arranged in said bearings and carrying a commutator adjacent one of said bearings, a fan on said shaft at the upper end thereof, said casing being provided with openings defining a path for the circulation of air by said fan through said casing and over parts of said motor, said upper casing member being provided with an aperture partition below said upper bearing which defines at least part of a motor cooling fan chamber, commutator brushes carried by said partition, the aperture in said partition being of such size and shape as to permit said fan to be passed therethrough while assembled on said shaft, said upper casing member and armature shaft being separable from the lower casing member as a unit, said armature shaft with said fan secured thereon being separable as a unit from said upper casing member after separation thereof from said lower casing member by translating said fan through said aperture thereby to complete the removal of the armature shaft from said upper and lower casing members.

16. In an electric motor a casing comprising upper and lower members detachably secured together to define a housing for the motor, a bearing carried by said lower casing member, a bearing detachably secured to the upper casing member, an armature shaft rotatably supported by said bearings and a commutator carried by said shaft adjacent the upper one of said bearings, a fan secured on said shaft at the upper end thereof adjacent said upper bearing, said casing being provided with openings defining a path for the circulation of air by the fan through the casing and over the parts of the motor, said upper casing member being provided with an apertured partition below said upper bearing which defines at least part of a motor cooling fan chamber, commutator brushes carried by said partition, the aperture in said partition being of a size and shape to permit the fan while assembled to said shaft to be passed through said aperture, said upper casing member being separable from the lower casing member, and said armature shaft with said fan thereon being separable as a unit from said upper casing member by passing said fan through said aperture.

17. In an electric motor a casing comprising a plurality of members detachably secured together to define a housing for the motor, one of said casing members being provided with a bearing, a bearing detachably secured to the other casing member, an armature shaft rotatably supported by said bearings, a fan secured on said shaft adjacent said detachable bearing and between said bearings, an apertured partition secured to said other casing member adjacent said detachable bearing and defining at least part of a motor cooling fan chamber, commutator brushes carried by said partition, a commutator carried by said shaft and operatively associated with said brushes, the aperture in said partition being of such size and shape as to permit said shaft with said fan assembled thereto to be disassembled as a unit from said other casing member, said other casing member and armature shaft being separable as a unit from said first-mentioned casing member, said armature shaft with said fan assembled thereon being separable as a unit from said other casing member after separation thereof from said first-mentioned casing member by translating a part of said fan and shaft unit through said aperture thereby to complete the removal of said armature shaft from said casing member, said casing being provided with openings defining a path for the circulation of air by said fan through said casing and over the heat generating parts of said motor.

18. In an electric motor a casing comprising separable casing members detachably secured together to define a housing for a motor, one of said casing members being provided with a bearing, a bearing detachably secured to another casing member, an armature shaft rotatably supported by said bearings, a fan secured on said shaft adjacent said detachable bearing and between said bearings, said casing being provided with openings defining a path for the circulation of air by said fan through said casing and over the heat generating parts of said motor, said other casing member being provided with an apertured partition adjacent said detachable bearing which defines at least part of a motor cooling fan chamber, commutator brushes carried by said partition, a commutator carried by said shaft and operatively associated with said brushes, the aperture in said partition being smaller than said fan which is arranged in said chamber but of a size to permit said fan when tilted relative to said partition to pass through said aperture, said other casing member and armature shaft being separable as a unit from said one casing member, said armature shaft with said fan assembled thereon being separable as a unit from said other casing member after separation thereof from said one casing member by displacing said shaft toward one side of said aperture in said partition and then tilting said shaft relative to said casing so as to permit the translation of said fan through said aperture thereby to complete the removal of said armature shaft from said casing members.

GORDON H. BROWN.

REFERENCES CITED

The following references are of record in the file of this patent:

UNITED STATES PATENTS

| Number | Name | Date |
|---|---|---|
| 1,876,767 | Seldon | Sept. 13, 1932 |
| 2,038,446 | Redmond | Apr. 21, 1936 |
| 2,099,050 | Chamberlain | Nov. 16, 1937 |
| 2,157,191 | Sinnett | May 9, 1939 |
| 2,253,191 | Morrill | Apr. 19, 1941 |
| 2,265,809 | Korte | Dec. 9, 1941 |
| 2,301,156 | Behlen | Nov. 3, 1942 |
| 2,322,932 | Hahn | June 29, 1943 |
| 2,360,303 | Ingalls | Oct. 10, 1944 |

FOREIGN PATENTS

| Number | Country | Date |
|---|---|---|
| 463,029 | Great Britain | Mar. 19, 1937 |
| 496,467 | Great Britain | Nov. 30, 1938 |
| 503,409 | Great Britain | Apr. 3, 1939 |
| 372,328 | Germany | Mar. 26, 1923 |